United States Patent [19]

Kawakami et al.

[11] Patent Number: 5,307,214
[45] Date of Patent: Apr. 26, 1994

[54] MAGNETIC RECORDING APPARATUS

[75] Inventors: Kanji Kawakami, Mito; Yoshiakira Karakama, Hadano; Masayuki Takagi, Odawara; Takayoshi Ohtsu, Kanagawa; Hisayasu Honma, Hiratsuka; Tetsuo Kobayashi, Kanagawa; Yutaka Sugita, Tokorozawa; Katsuya Mitsuoka, Hitachi, all of Japan

[73] Assignee: Hitachi, Ltd., Tokyo, Japan

[21] Appl. No.: 848,137

[22] Filed: Mar. 9, 1992

[30] Foreign Application Priority Data

Mar. 13, 1991 [JP] Japan .................................. 3-072042

[51] Int. Cl.$^5$ ............................................. G11B 15/12
[52] U.S. Cl. ...................................... 360/61; 360/46; 360/62
[58] Field of Search .................... 360/61, 46, 62, 67, 360/68

[56] References Cited

U.S. PATENT DOCUMENTS 5,168,395 12/1992 Klaasen et al. ...................... 360/46

FOREIGN PATENT DOCUMENTS 6023766 7/1983 Japan .

OTHER PUBLICATIONS

"Delayed Relaxation in Thin-Film Heads" IEEE Trans. on Magnetics, vol. 25, No. 5, pp. 3212-3214, Sep. 1989.

Primary Examiner—Donald Hajec
Assistant Examiner—J. Clark
Attorney, Agent, or Firm—Antonelli, Terry, Stout & Kraus

[57] ABSTRACT

A magnetic recording apparatus for recording information on a magnetic recording medium. A circuit for generates a recording current pulse train and supplies the pulse train to a magnetic head. The last pulse of the recording current pulse train dampled waveform. A ripple current is superposed on the damped waveform.

13 Claims, 4 Drawing Sheets

MAGNETIZATION CURVE

CURRENT WAVE FORM

MAGNETIZATION CURVE

CURRENT WAVE FORM

MAGNETIC RECORDING APPARATUS

BACKGROUND OF THE INVENTION

The present invention relates to a magnetic recording apparatus capable of reproducing (or reading out) information immediately after the information has been recorded (or written). More particularly, the present invention relates to a magnetic recording apparatus which does not cause such a noise as would adversely affect information which is reproduced immediately after the recording thereof.

In general, in magnetic recording apparatuses, it is well known from IEEE TRANSACTIONS ON MAGNETICS, VOL. 25, NO. 5, September 1989, pp.3212–3214 (hereinafter, referred to as "article A", when applicable) for example that immediately after information has been written onto a magnetic recording medium by a magnetic head, a phenomenon occurs in which a noise is caused in the form of pulse in the magnetic head. This phenomenon causes a problem when the magnetic recording apparatus is switched over to reproducing the information immediately after the magnetic recording apparatus has recorded the information, and so the probability that an error will occur in the reproduced information increases.

In a prior art magnetic head which employs ferrite, there arose in some cases a problem that after information has been recorded, reading performance of the magnetic head is degraded. This problem is caused by the magnetization curve of the ferrite material having large hysteresis, with the result that the ferrite material is magnetized after the write operation. In other words, there arises problems such as the asymmetry between the read waveform of positive polarity and that of negative polarity due to the magnetization, decrease of the read sensitivity due to the decrease of permeability, and so forth. As a means for reducing those problems, there is shown in JP-B-60-23766 (UM) (hereinafter, referred to as "article B", when applicable) for example a method in which a pulse for reducing the magnetization of the magnetic core is added to the last current pulse of the write current pulse train used for recording the information. In the article B, there are shown a method of adding a plurality of pulse trains and a method of adding one pulse of reverse polarity.

SUMMARY OF THE INVENTION

The method shown in the article B aims to solve the above-mentioned problems by applying, as shown in FIG. 1A and FIG. 1B, an alternating pulse to demagnetize the ferrite material. That is, the pulse opposite in polarity to the last write current pulse is applied at least one time to release the operating point of the ferrite material from the major loop of the magnetization curve to bring it to a state near the demagnetization state.

On the other hand, the result of a study by the present inventors has proved that the latter, i.e., the method of adding one pulse of reverse polarity, as proposed by the article B, is imperfect as the solution to the problems, and a large number of pulses are required to solve sufficiently the problems by the method of adding a plurality of pulse trains. This is undesirable for recording and reproducing at a high speed.

More specifically, it is required in many cases that immediately after one information group (information block) has been recorded, the subsequent information group (information block) be recorded or reproduced after a short interval of time. The reason for performing such an operation is that since if the interval of time between two information groups is increased, the useless portion which does not contribute to the recording of the information is increased on the surface of the recording medium. This undesirability must be effectively prevented. Especially, in an apparatus, such as a magnetic disc memory, in which the peripheral speed of the recording medium is large, the interval of time between the data group and the subsequent data group is selected to be 10 $\mu$sec or so, and further, during this interval of time, the identification information of the data group, the information for determining the position of the magnetic head, and the like are written. Therefore, it is required that the apparatus be switched over to the read operation for a short time, e.g., several $\mu$sec, after the completion of the write operation of the data group. In such a case, it is readily understood that the method requiring adding a large number of pulse trains is undesirable.

Further, a magnetic disc memory or a flexible disc, in which one magnetic head is used for both the writing and reading of the information, is influenced considerably. For example, in a hard disc apparatus or a floppy disc apparatus, the index information and the servo information are read out immediately after the write operation thereof, but an error occurs in the read operation for the index information due to noises. Since in those apparatuses, the read amplifier and the write amplifier are connected to the magnetic head, if a write current having a high rate of change is applied, a large voltage is developed across the terminals of the magnetic head due to the inductance of the magnetic head. Then, the read amplifier is in an inoperative state, i.e., in a suffocation state, for 2 to 3 $\mu$sec to several $\mu$sec due to the voltage thus developed. Therefore, in the case of the article B, since a bipolar, i.e., large amplitude, pulse for preventing noise in the magnetic head is applied to the input of the read amplifier, the inoperative state of the read amplifier continues during the application of that pulse. In other words, the switching time from the write operation to the read operation increases by a period of time when the noise preventing pulse is applied.

It is therefore an object of the present invention to provide a magnetic recording apparatus in which a magnetic head is forcedly made to be in a state of being free from the occurrence of the above pulse-like noise for a short time such as 1 to 2 $\mu$sec, immediately after the write operation for the information has been completed, i.e., immediately after the last information write current pulse has been completed, thereby reducing the useless area of a magnetic recording medium to prevent the decrease of information storage capacity of the magnetic memory by overcoming the above-mentioned prior art problems.

In order to attain the above object, according to one aspect of the present invention, the last current pulse of an information recording current pulse train to be supplied to a magnetic head has a waveform which is obtained by superposing a ripple current on a monotone damped wave form. The amplitude of the ripple current is preferably a value corresponding to the number of ampere-turns, in the range of about one-several hundredths to one-tenth (i.e., about 1/100 to 1/10) of the number of ampere-turns of the magnetic head required for the recording of the information. The last current pulse may be the last pulse of the information recording current pulse train to be recorded or may be one added after the information recording current pulse train.

A square wave having a duty ratio of 50%, a unipolar or bipolar pulse, or a pulse having a waveform obtained by differentiating a square wave or the like, is suitable for the waveform of the ripple current.

The period of time when the ripple current is superposed is within a period of time when the reproducing amplifier is inoperative, immediately after the magnetic head is switched over from the recording operation to the reproducing operation.

The principle of operation of the present invention based on the above mechanism will hereinafter be described.

With respect to the cause of the occurrence of the noise immediately after the writing of information, it is described in the article A that the rapid lowering of the temperature in the position near the magnetic head immediately after the write operation forms a beginning (trigger). A study by the present inventors, however, found that the above description is not true. The first reason for this is that the noise also occurs in the magnetic head of the so-called MIG (Metal in Gap) type. That is, since in the magnetic head of the MIG type, the resistance of the coil is small, the rise in the temperature of the magnetic head due to the write current is negligible. In spite of this, however, a great number of noises occurred in some of MIG type magnetic heads.

The second reason for this is shown by the experimental fact that even in case of a thin film magnetic head, even though the flowing time of the write current was shortened to 1 μsec or less to reduce heating in the coil, the number of appreciable occurrences of noise was not reduced.

On the other hand, when the inductance across the terminals of the coil of the magnetic head was measured while applying to the coil a dc current which was gradually decreased with a time, a small swing was observed in the inductance value. Then, there was obtained the experimental result that the number of peaks of the swing sufficiently corresponded to the frequency of occurrence of the noise in the magnetic head. Further, when a small bipolar current pulse was superposed on the dc bias current at fixed intervals, the swing of the inductance of the magnetic head disappeared. On the basis of the above two experimental results, the causes of the occurrence of the noise of the magnetic head can be considered as follows.

(1) After the write current, which is used to excite the magnetic core of the magnetic head, has disappeared, the magnetic head has trapping points which hinders the uniform relaxation of the magnetization of the magnetic core.

FIG. 2 is a graphical representation showing the state in which the trapping points are present on the B-H curve (magnetization curve)..FIG. 3 is a graphical representation of FIG. 2 with the abscissa (H axis) thereof expanded, showing the state in which the magnetic flux is changed in a step-like manner due to the occurrence of the traps on the B-H curve.

(2) The step-like change of the magnetic flux in passage through each trapping point provides a voltage pulse across the terminals of the coil of the magnetic head.

Moreover, from the above-mentioned second experimental result, there is suggested the following method of preventing the influence of noise of the magnetic head. More specifically, it is considered that if joggles, as shown in FIG. 4, are given to the process in which the magnetization of the magnetic core is relaxed, so that the magnetization can be forcedly passed through the traps (the magnetization can be forcedly cleared of the traps, i.e., the above trapping points can be overcome), it is possible to concentrically generate the above noises at a time when the reproduction of the information is not influenced, and then any noise to be generated is no longer present at the time when the reproduction of the information is performed. Further, a concrete implementation method thereof can be also suggested from the above second experimental result. That is, if the last write current pulse is not rapidly interrupted, but is made to be a slowly damped pulse waveform which comes to an end within the allowable time so that the small joggle pulses are superposed on the resultant pulse waveform, it is possible to concentrically generate the noise of the magnetic head only within the allowable time (a period of time of the suffocation of the read amplifier).

In case of the prior art method shown in the article B, since the bipolar pulse of which amplitude is gradually decreased is applied, there is the possibility that since the quantity of change of the magnetic flux of the magnetic core is large, the operating point of the magnetization is again trapped in the same trap.

On the other hand, in the present invention, the amplitude of the joggle pulse can be made to be smaller than the above step, and the magnetic core is swept with the joggle pulses during the reduction of the amplitude of the write current pulse from the maximum value to zero, so that the magnetization can be released from all of the traps. Moreover, since the amplitude of the joggle pulse is small and the change rate with respect to time of the monotone damped current is small, there is no possibility that the current for preventing the occurrence of the noise of the magnetic head cause an inoperative state of the read amplifier. That is, the measure to prevent the occurrence of the noise of the magnetic head can be completed within the operation recovery time of the prior art read amplifier (a period of time required for the suffocation state to come to an end).

Looking at the finding that noise occurs when the traps, which have been generated in the process of the relaxation of the core, are removed later for some reason or other, it is a feature of the present invention that such traps are removed earlier (or within a period of time of the suffocation of the amplifier), thereby to prevent the noise from occurring (during the reproduction of the data), which is a complete departure from the prior art method of removing the causes of the occurrence of the noise by demagnetizing the magnetic head core.

DESCRIPTION OF THE PREFERRED EMBODIMENT

The preferred embodiment of the present invention will hereinafter be described with reference to the accompanying drawings.

Figure 1A:
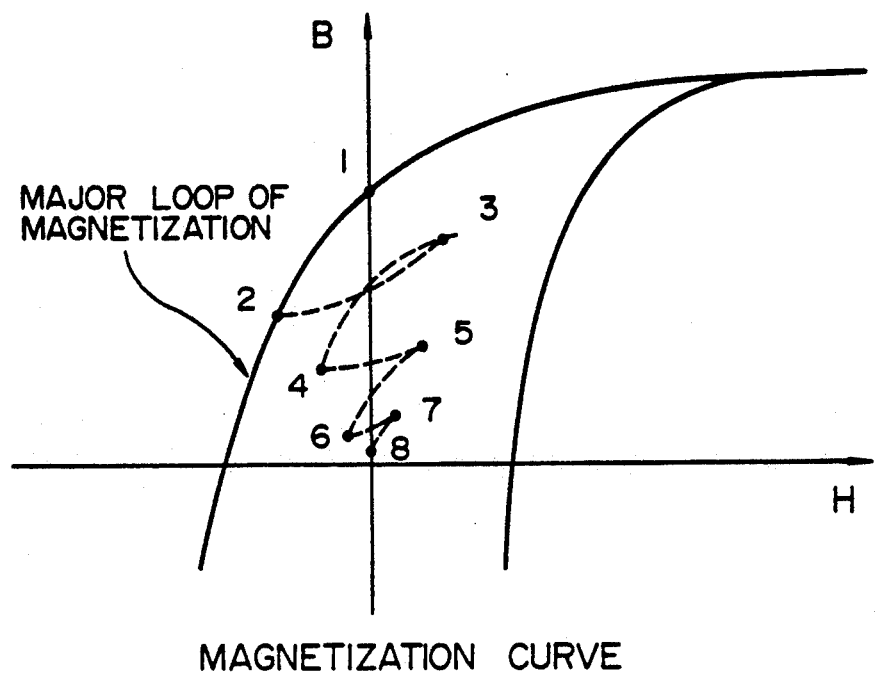
FIG. 1A and FIG. 1B are graphical representations showing respectively a magnetization curve of the prior art ferrite head core and an exciting current waveform thereof.
Figure 1B:
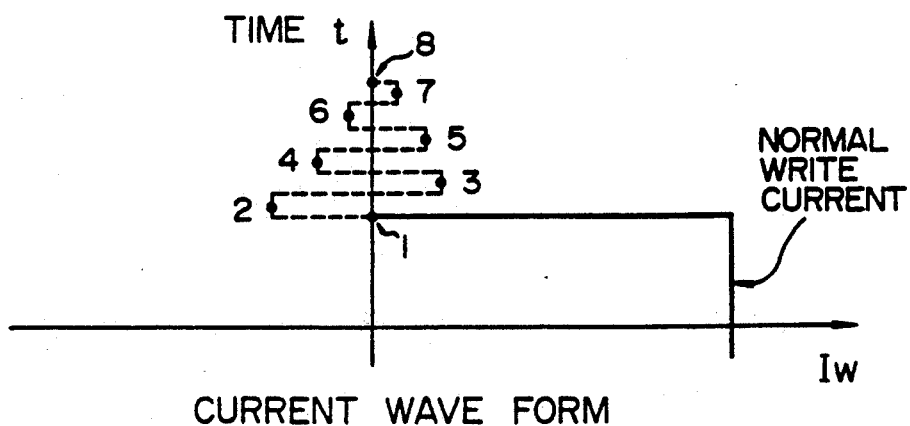
Figure 2:
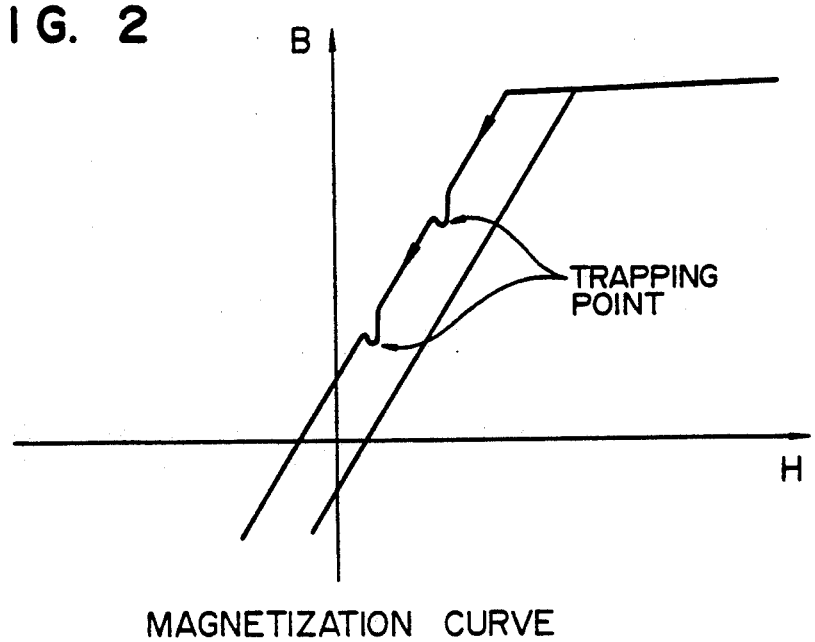
FIG. 2 is a graphical representation showing a magnetization curve of a thin film head core.
Figure 3:
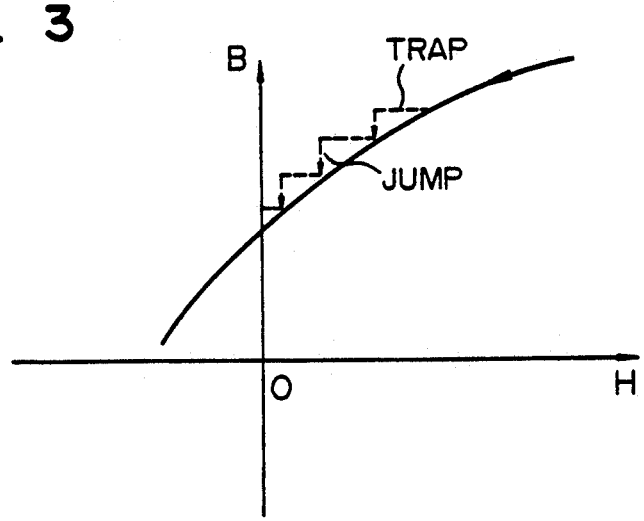
FIG. 3 is a graphical representation showing a B-H curve useful in explaining the operation of the present invention.
Figure 4:
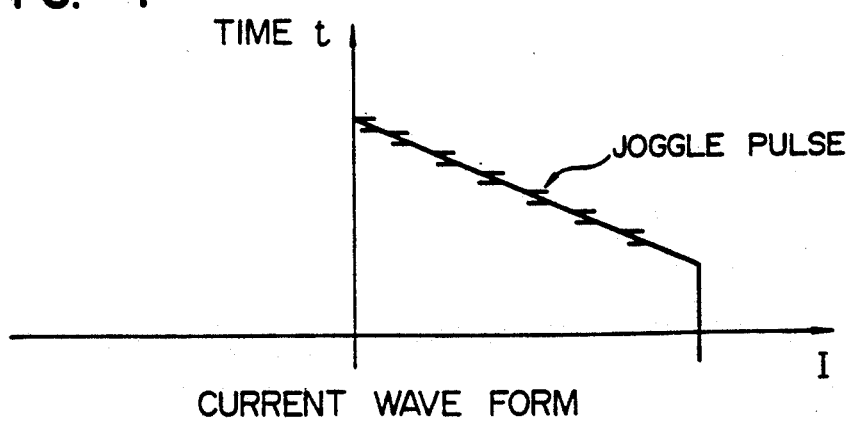
FIG. 4 is a graphical representation showing an exciting current waveform of a thin film head core useful in explaining the operation of the present invention.
Figure 5:
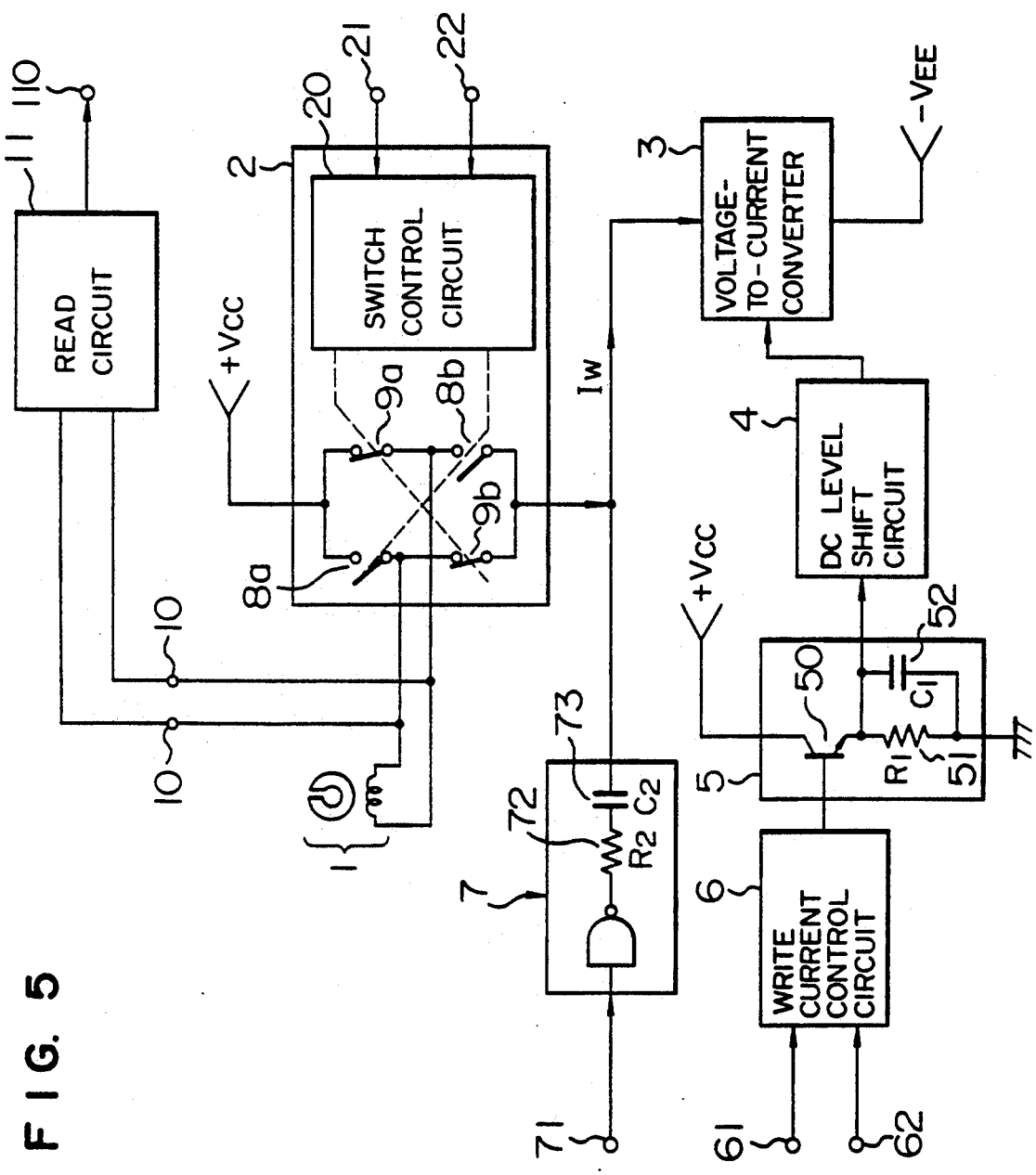
FIG. 5 is a circuit block diagram showing the arrangement of a circuit of one embodiment of the present invention.

FIG. 5 is a circuit block diagram showing the arrangement of a specific circuit as one embodiment for carrying out the above operation of the present invention.

In FIG. 5, reference numeral 1 designates a magnetic head; reference numeral 2, a write amplifier; reference numeral 3, a voltage-to-current converter; reference numeral 4, a dc level shift circuit; reference numeral 5, a write trailing edge generation circuit; reference numeral 6, a write current control circuit; reference numeral 7, a joggle pulse generation circuit; reference numeral 10, a pair of output terminals of the magnetic head 1 which are useful when the magnetic head 1 is operated as a reproducing head; reference numeral 11, a read circuit including a read amplifier; and reference numeral 110, an output terminal for a read signal.

The circuit shown in FIG. 5 is arranged in such a way as to provide the addition of a trailing edge generation circuit 5 and a joggle pulse generation circuit 7 for a prior art write current generation circuit. Thus, it is readily understood that the circuit shown in FIG. 5 is easily implanted.

The operation of the individual sections will hereinbelow be described with reference to FIG. 5.

The write amplifier 2 for applying a bipolar current to the magnetic head 1 is made up of four switching elements 8a, 8b, 9a and 9b, and a circuit 20 for controlling the opening or closing operation of those switching elements. The switching elements 8a, 8b, 9a and 9b are high speed switching elements such as transistors. The elements 8a and 8b, and the elements 9a and 9b are individually paired to be operated. In this connection, one pair of elements 8a and 8b, and another pair of elements 9a and 9b are opened or closed at a high speed, with the operation of the two pairs being 180 degrees out-of-phase relative to each other. For example, when the elements 8a and 8b are opened, the elements 9a and 9b are closed. Then, a current is caused to flow from a voltage source of positive potential +Vcc to the voltage-to-current converter 3 through the switching element 9a, the magnetic, head 1 and the switching element 9b. It is apparent that when the switching elements 9a and 9b are opened and the switching elements 8a and 8b are closed, the polarity of the current flowing through the magnetic head 1 is reversed. Moreover, it is also apparent that the amplitude of the magnetic head write current is such that the zero-to-peak value of the write current is equal to a current value Iw which is sunk or absorbed in the voltage-to-current converter 3. A switch control circuit 20 serves to open or close the switching elements 8a, 8b, 9a and 9b so as to fulfill the above operation. That is, whenever a write signal pulse is supplied from a terminal 21, the circuit 20 switches the opening or closing state of the two pairs of switching elements. But, when a write enable signal is not applied to a terminal 22, the circuit 20 makes all of the switching elements 8a, 8b, 9a and 9b be in the open state.

The voltage-to-current converter 3 is a circuit which generates a current corresponding to the value of the voltage applied to its input terminal, and is constructed in such a way that even if the voltage across the output terminals of the circuit 3 is slightly changed, the value of change in the output current is negligibly small.

The dc voltage level shift circuit 4 serves to shift in parallel the operation level of the dc voltage to the voltage to current converter 3 from the write trailing edge generation circuit 5, i.e., to faithfully transmit the quantity of change of the output voltage of the circuit 5 to the converter 3.

The trailing edge generation circuit 5 serves to faithfully transmit the leading edge of an output pulse of the write current control circuit 6 and to give a trailing edge (a trailing waveform) to the falling edge thereof when the pulse terminates. A transistor 50 operates as an emitter-follower transistor having a small output impedance for the input of positive voltage, and the output voltage waveform thereof is not influenced by the capacitor C1 (52). When the input voltage becomes zero, the transistor 50 is cut off. Therefore, the trailing edge is generated in accordance with the time constant determined by a resistor R1 (51) and the capacitor C1 (52). For example, assuming that the value of the resistor R1 and that of the capacitor C1 are respectively 330 Ω and 1000 pF, then the time constant becomes about 0.33 μsec, so that the trailing edge becomes substantially zero in 1 μsec is generated.

The write current control circuit 6 is a circuit which outputs a voltage having a value corresponding to a write current setting signal applied to a terminal 61 only for the duration of a write gate signal applied to a terminal 62.

The joggle current generation circuit 7 is a circuit which generates a joggle current by utilizing the functions of a resistor R2 (72) and a capacitor C2 (73) on a pulse signal applied to a terminal 71. For example, assuming that the value of the resistor R2 and that of the capacitor C2 are respectively 3300 Ω and 100 pF, then the time constant is 0.33 μsec. When the joggle pulse signal, which is applied to the terminal 71, has a frequency of 50 MHz, an on-off ratio of 50% (i.e., the joggle pulse signal is in the on state for 10 nsec and in the off state for 10 nsec) and an amplitude of 1V, the output current of the circuit 7 has a square waveform having a frequency of 50 MHz and a peak-to-peak amplitude of about 0.3 mA. When a current is, for example, caused to flow from the circuit 7, the current flowing from the write amplifier 2 is decreased by the same amount, because the current flowing from the circuit 7 flows into the voltage-to-current converter 3 (i.e., the current flowing into the voltage-to-current converter 3 is the sum of the current flowing from the circuit 7 and the current flowing from the amplifier 2). As a result, the write current is decreased. That is, the output current of the joggle current generation circuit 7 gives a ripple current to the write current, the ripple current being equal to the output current in amplitude and being different by 180 degrees in phase.

Figure 6:
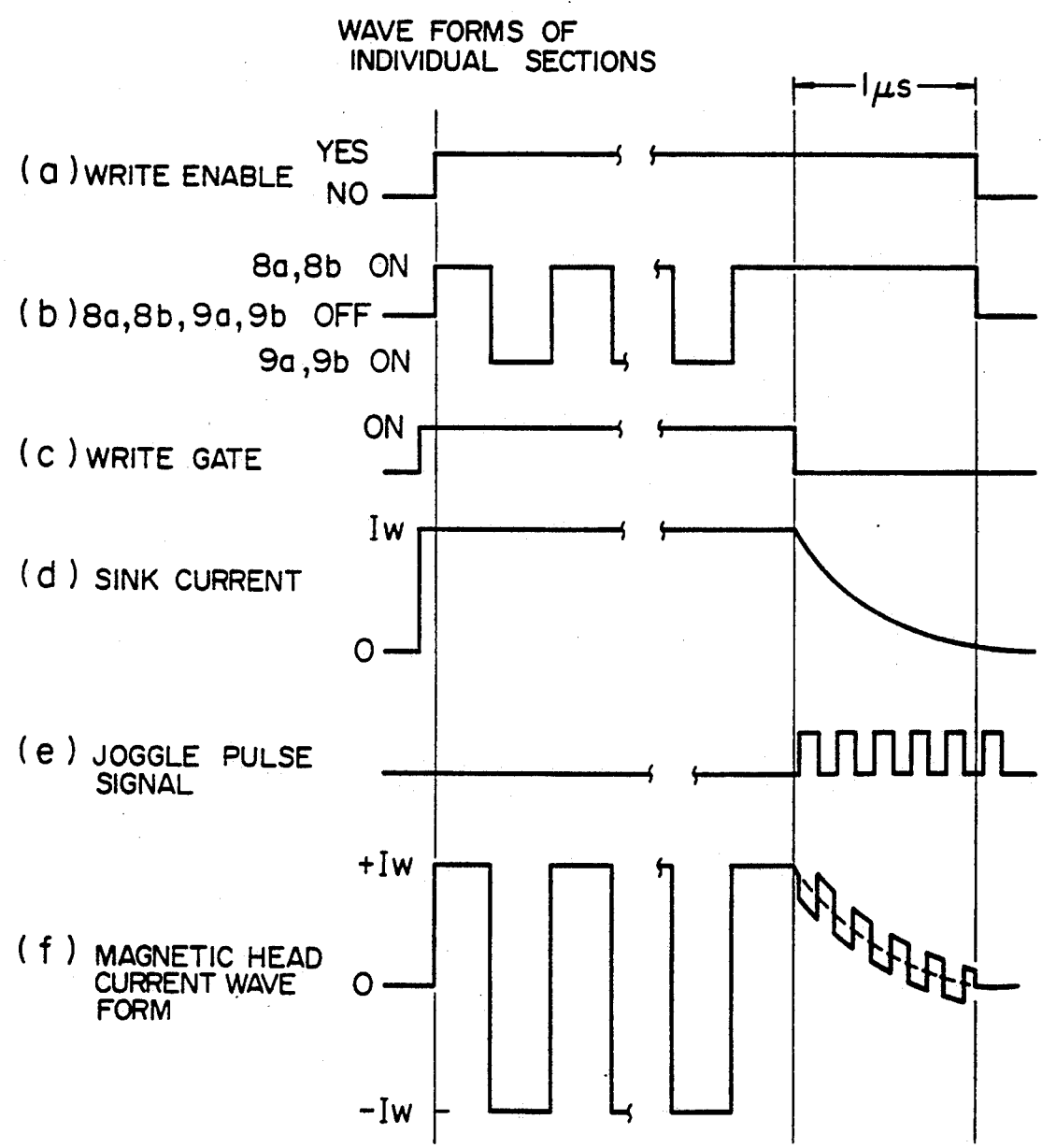
FIG. 6 is a time chart showing operation waveforms of the circuit shown in FIG. 5.

Next, description will be given to the wave forms obtained from the individual sections of the circuit shown in FIG. 5 with reference to FIG. 6. First, when a write enable signal (applied to the terminal 22) as shown in FIG. 6(a), and a write information signal (applied to the terminal 21), made up of a pulse train having fixed intervals for example, are applied to the switch control circuit 20, the two pairs of switching elements 8a, 8b, and 9a, 9b are opened or closed in the manner as shown in FIG. 6(b). By the functions of the write gate signal as shown in FIG. 6(c) and the trailing edge generation circuit 5, the current flowing into the voltage-to-current converter 2 is determined in the manner as shown in FIG. 6(d). After the write gate signal has been completed, if a joggle pulse signal is given in the manner as shown in FIG. 6(e) for a period of time slightly longer than 1 μsec, a joggle current having a similar waveform to that shown in FIG. 6(e) occurs.

As a result, the current applied to the magnetic head has the wave form as shown in FIG. 6(f).

The experimental obtained by the present inventors has proved that in 4000 trials, in the case where no measure is taken, the noise pulses are generated 100 times or so on average for several msec by the magnetic head (the frequency of occurrence is the largest immediately after the completion of the write operation and then is decreased exponentially for several msec), but in the case where the measure described in the article B is taken, the frequency thereof is reduced to 10 to 30 times. On the other hand, in the case where the method described in the present embodiment is carried out, the frequency of occurrence of the noise pulses is reduced to 3 times or less.

Moreover, the present embodiment also has an effect that the influence upon the time intervals among the data groups can be reduced. That is, since the noises of the magnetic head are caused to concentrically occur within 1 μsec, all of the noises are generated out for that period of time, and thereafter the number of occurrences of the noises will be considerably reduced (the noises will be hardly generated). In case of a recording apparatus in which a magnetic head is used a reading operation as well as writing operation, it is possible to complete the measure to reduce the noises within the recovery time of the read amplifier, operation, and therefore, operation of the recording apparatus can be performed in such a way that any noise does not influence the time interval in the subsequent reproduction of a data group.

The amplitude of the superposed joggle pulse (ripple) may be constant during the superposing period of time. In the case of the above embodiment, the value of the amplitude may be in the range of 0.3 to 1 mA or so. The point is that that amplitude is just large enough to remove the above-mentioned traps (note that the value of the data write current flowing from the circuit 2 into the circuit 3 is 20 mA or so). The waveform thereof may be, instead of the square wave used in the above embodiment, a pulse-like wave obtained by differentiating the square wave (in this case, the value of the capacitor C2 in the circuit 7 shown in FIG. 5 is made to be smaller), or a unipolar or bipolar pulse-like wave. Since it is preferable that the number of joggle pulses, which are applied within a short time when the reproducing amplifier is inoperative, is somewhat large, the frequency of the joggle pulse is set to a relative high value, such as several tens of MHz.

Incidentally, in general, the magnetization of the magnetic head required in the write operation is in the range of 200 mAT (ampere-turn) to 600 mAT. The amplitude of the ripple current may be a value providing in the range of about one-several hundredths to one-tenth the number of ampere-turn-for the write operation. With the ripple current having a current value less than or equal to the lower limit for that range, the desired effect cannot be obtained. On the other hand, the ripple current having a current value more than or equal to the upper limit for that range is difficult to be obtained from the limits of the used circuit used.

The core material of the magnetic head applied to the present invention is not limited especially. However, in a high speed material (for a high frequency), the magnitude of the noise tends to be smaller. This is effective to a permalloy core thin film head having a relative large amplitude of noise or an amorphous head.

As set forth in detail hereinabove, according to the present invention, there is provided an effect that in the last current pulse of an information recording current pulse train, the current which is obtained by superposing a small ripple wave on the monotone damped waveform is supplied to the magnetic head, whereby the noises of the magnetic head are caused to concentrically occur within a period of time when the reproducing amplifier is inoperative so that the number of occurrence of the noise pulses in the subsequent operation of the reproducing amplifier can be considerably reduced.

While this invention has been described with reference an illustrative embodiment, this description is not intended to be construed in a limiting sense. Various modifications to the illustrative embodiment, as well as other embodiments of the invention, will be apparent to persons skilled in the art upon reference to this description. For example, in the embodiment shown in FIG. 5, the output current of the joggle pulse generation circuit 7 is caused to flow into the voltage-to-current converter 3. Alternatively, however, the apparatus may be arranged in such a way that the voltage-to-current converter 3 is controlled by the output of the circuit 7. It is therefore contemplated that the appended claims will cover any such modifications or embodiments as fall within the true scope of the invention.

We claim:

1. A magnetic recording apparatus, for recording information on a magnetic recording medium, said magnetic recording apparatus comprising:
   a magnetic head;
   recording current means electrically connected to said magnetic head, for providing to said magnetic head a recording current pulse train having as the last current pulse thereof a pulse with a damped waveform; and
   joggle current means for superposing a ripple current on the damped waveform.

2. A magnetic recording apparatus according to claim 1, wherein said magnetic head has a pair of terminals for providing a reproduced signal and is usable for reproduction of recorded information.

3. A magnetic recording apparatus according to claim 2, wherein said joggle current means provides a ripple current with a square waveform having a duty ratio of 50%.

4. A magnetic recording apparatus according to claim 3, wherein said recording current means provides the last current pulse within a period of time immediately after said magnetic head has switched over from recording operation to reproducing operation.

5. A magnetic recording apparatus according to claim 2, wherein said joggle current means provides the ripple current as a unipolar or bipolar pulse current.

6. A magnetic recording apparatus according to claim 5, wherein said recording current means provides the last current pulse within a period of time immediately after said magnetic head has switched over from recording operation to reproducing operation.

7. A magnetic recording apparatus according to claim 2, wherein said joggle current means provides a ripple current having a waveform obtained by differentiating a square waveform.

8. A magnetic recording apparatus according to claim 7, wherein said recording current means provides the last current pulse within a period of time immediately after said magnetic head has switched over from recording operation to reproducing operation.

9. A magnetic recording apparatus according to claim 2, wherein said recording current means provides the last current pulse within a period of time immediately after said magnetic head has switched over from recording operation to reproducing operation.

10. A magnetic recording apparatus according to claim 1, wherein said joggle current means provides a ripple current with a square waveform having a duty ratio of 50%.

11. A magnetic recording apparatus according to claim 1, wherein said joggle current means provides the ripple current as a unipolar or bipolar pulse current.

12. A magnetic recording apparatus according to claim 1, wherein said joggle current means provides a ripple current having a waveform obtained by differentiating a square waveform.

13. A magnetic recording apparatus according to claim 1, wherein said joggle current means provides a ripple current providing in the range of about one-hundredth to one-tenth the number of ampere-turns required for magnetizing said magnetic head for recording of information.

* * * * *